United States Patent [19]

Pobelle

[11] Patent Number: 4,650,154
[45] Date of Patent: Mar. 17, 1987

[54] BLANKING COVER FOR PIPE

[75] Inventor: Jacques Pobelle, Is-sur-Tille, France

[73] Assignee: Commissariat a l'energie Atomique, Paris, France

[21] Appl. No.: 773,503

[22] Filed: Sep. 4, 1985

Related U.S. Application Data

[63] Continuation of Ser. No. 554,215, Nov. 22, 1983, abandoned.

[30] Foreign Application Priority Data

Nov. 25, 1982 [FR] France ............... 82 19781

[51] Int. Cl.$^4$ .................. F16K 31/64; F16K 31/02; F16K 31/12
[52] U.S. Cl. ...................... 251/58; 251/12; 137/456; 137/457; 137/554; 126/285 B
[58] Field of Search ............ 126/285 R, 285 B, 287.5; 251/12, 56, 58, 66, 67, 68; 137/489.5, 456, 457, 459, 554

[56] References Cited

U.S. PATENT DOCUMENTS

| | | | |
|---|---|---|---|
| 365,040 | 6/1887 | Bassett | 251/12 |
| 422,956 | 3/1890 | Malmborg | 126/285 B |
| 924,680 | 6/1909 | Locke | 251/68 |
| 1,897,000 | 2/1933 | Bierg | 251/68 |
| 2,057,702 | 10/1936 | Belknap | 137/554 X |
| 2,264,275 | 12/1941 | Carlson | 126/287.5 X |
| 2,301,850 | 11/1942 | Bjergel | 251/14 |
| 2,381,926 | 8/1945 | Ray | 137/457 |
| 2,382,720 | 8/1945 | Hopkins | 251/68 |
| 3,254,660 | 6/1966 | Ray | 137/66 |
| 3,591,127 | 7/1971 | Luger | 251/58 |
| 3,874,401 | 4/1975 | Karg | 126/287.5 X |
| 3,923,475 | 12/1975 | Stenzet et al. | 137/457 X |
| 3,934,796 | 1/1976 | Smith, Jr. et al. | 236/16 |
| 4,177,716 | 12/1979 | Bowe et al. | 126/285 R |
| 4,313,592 | 2/1982 | Baas | 251/58 X |

FOREIGN PATENT DOCUMENTS

| | | |
|---|---|---|
| 2605451 | 8/1977 | Fed. Rep. of Germany . |
| 2657223 | 6/1978 | Fed. Rep. of Germany . |
| 1410589 | 9/1972 | United Kingdom . |

Primary Examiner—Samuel Scott
Assistant Examiner—Carl D. Price
Attorney, Agent, or Firm—Pearne, Gordon, McCoy & Granger

[57] ABSTRACT

A blanking cover for a pipe comprises a plate able to close the pipe by tilting or rocking under the action of gravity, about a pivot pin to which it is fixed. A part is fixed to the pin, and an electromagnet able to retract the part and fixed to another part rotates on the pin and a jack is provided for actuating the other part. When excited, by attracting the part, the electromagnet makes it possible to keep the pipe open. Its deexcitation leads to the tilting of the plate and consequently to the closing of the pipe. If a tilting or rocking problem occurs, the action of the jack on the other part brings about the tilting by displacing the part. In order to reopen the pipe, the jack is actuated so as to press the excited electromagnet against the part and is then actuated in the opposite direction.

11 Claims, 4 Drawing Figures

BLANKING COVER FOR PIPE

This is a continuation of application Ser. No. 554,215, filed on Nov. 22, 1983, now abandoned.

BACKGROUND OF THE INVENTION

The present invention relates to a blanking cover for a pipe. It more particularly applies to fire arresting valve equipment, particularly fire arresting valves for equipping extraction-ventilation or blowing ducts, for example of the type encountered in installations for treating radioactive products.

Blanking covers used as fire arresting valves in such installations are known. These blanking covers suffer from reliability and safety deficiencies, because they have a flexible plate tilting or rocking under the action of gravity, but whose tilting is unreliable, so that if it does not tilt, manual intervention is required at the location of the blanking cover and fire can break out.

SUMMARY OF THE INVENTION

The object of the present invention is to obviate these disadvantages.

The present invention consequently relates to
 a blanking cover for a pipe, wherein it comprises means for sealing the pipe, able to occupy first and second positions corresponding respectively to the open and closed state of the pipe and passing from the first to the second position by tilting under the action of gravity, a part rendered integral with the closing means and able to occupy two positions respectively corresponding to the open and closed states of the pipe,
 a movable member for maintaining the part in place when it is excited by control means,
as well as means for displacing the member, and wherein the latter also serves to bring about, under the action of the displacement means, on the one hand in the excited state, a movement of the part from the position thereof corresponding to the closed state of the pipe to the position of the part corresponding to the open state of the pipe, the latter being stable while the member is excited and the closed state being obtained when the member is deexcited, this releasing the part and bringing about the tilting of the closing means, and on the other hand a reverse movement of the part, by ensuring the closing of the pipe in the case where the closing means have not tilted once the part has been released.

The tilting of the closing means is consequently ensured by the displacement means, if said closing means does not of its own accord tilt under the action of gravity, e.g. due to mechanical problems. The blanking cover according to the invention is consequently more reliable and safe than the prior art blanking covers.

The pipe can be positioned horizontally or vertically, or in any other direction.

According to a special feature of the blanking cover according to the invention, the means for displacing the member is a jack having a body and a rod articulated on the member, said jack displacing the member via the rod. For example, the jack is hydraulic, mechanical or electromagnetic.

According to another special feature, the closing means has a plate able to pivot within the pipe by means of a pivot pin to which it is fixed, the part being made integral with said pivot pin, whilst the member rotates with respect to said part and coaxially thereto.

According to another special feature, retainers or stops are provided within the pipe to define the second position of the plate.

According to a preferred feature of the invention, a fluid flows in the pipe and the plate tilts in the fluid flow direction.

According to another special feature of the invention, the pipe being vertical, the pivot pin is located outside the plate, so as to aid the tilting thereof. Obviously, the particular position of the pivot pin can be used, no matter what the position of the pipe.

According to another special feature of the invention, the member also has another part, which rotates with respect to the first-mentioned part and coaxially thereto, together with an electromagnet which can be excited by the control means and is mounted on said other part, the jack rod being articulated on said other part, whilst the first-mentioned part has an element which can be attracted by the electromagnet, when the latter is excited.

According to another feature of the invention, said member, said part and said displacement means are mounted on a frame for fixing to the pipe and said part has a rotation spindle for rotating relative to the frame and rigidly connected to the pivot pin of said plate and in the extension thereof, once the frame has been fixed to the pipe.

According to another feature of the invention, the pipe blanking cover according to the invention also has two electrical position switches, cooperating with said part to take account of the open or closed state of the pipe.

According to yet another special feature, the pipe blanking cover according to the invention also has a third electrical position switch cooperating with the member to take account of its position. These electrical position switches are, for example, microswitches.

BRIEF DESCRIPTION OF THE DRAWINGS

The invention is described in greater detail hereinafter relative to non-limitative embodiments and with reference to the drawings, wherein shown.

DETAILED DESCRIPTION OF THE INVENTION

Figure 1:
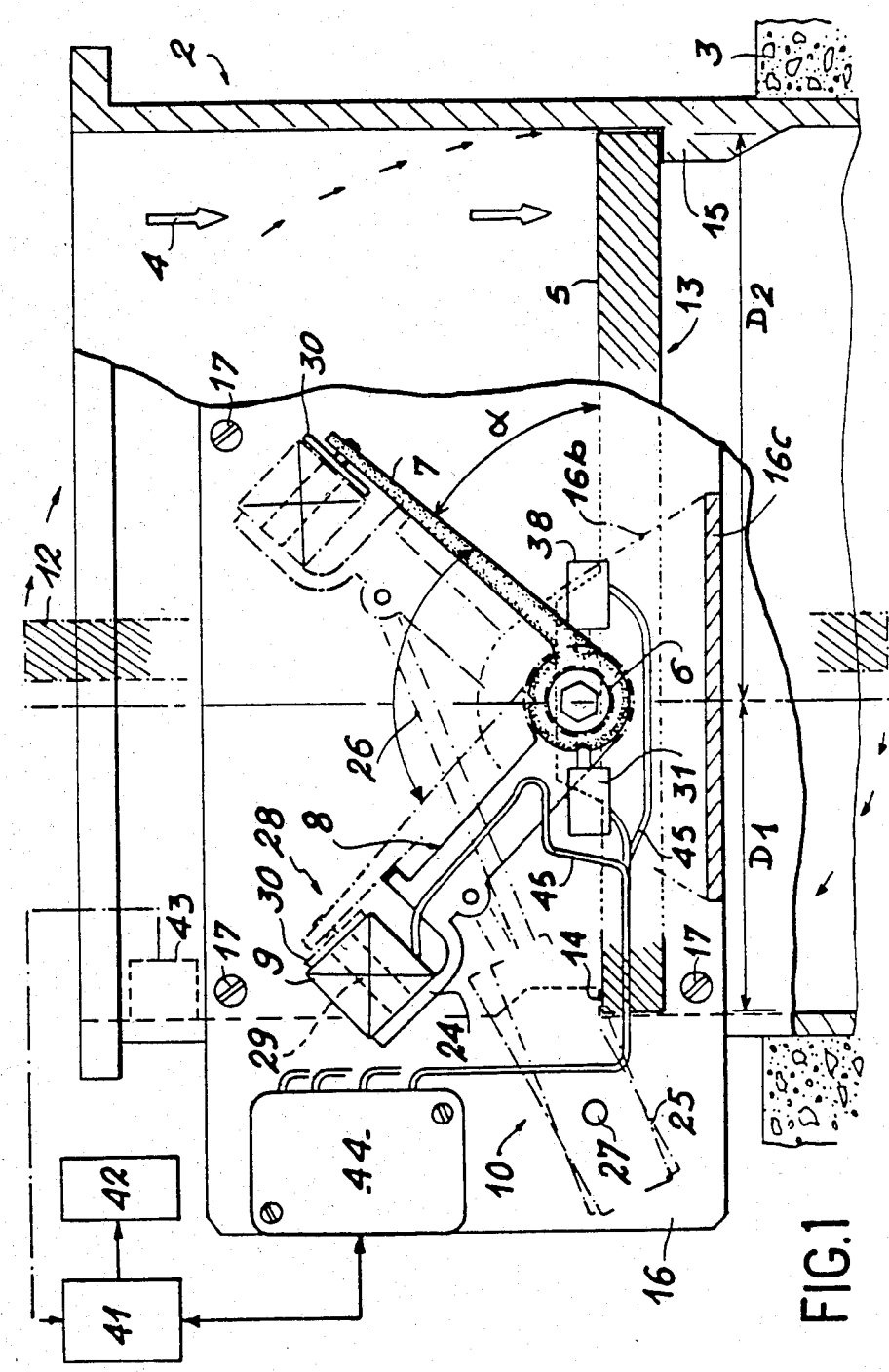
FIG. 1 a diagrammatic view of a special embodiment of the pipe blanking cover according to the invention.

FIG. 1 diagrammatically shows a special embodiment of the pipe blanking cover according to the invention. For example it is used as a fire arresting valve and is mounted on a pipe 2, which e.g. constitutes a fire arresting tunnel connecting two not shown (blowing or extracting) ventilating ducts traversing a fire arresting wall 3, floor or ceiling. For example, pipe 2 is vertical and can be traversed from top to bottom by a fluid such as air, symbolized by the arrows 4 in FIG. 1. The blanking cover according to the invention shown in FIG. 1 essentially comprises means for closing pipe 2, constituted by a movable plate 5, which is joined to a pivot pin 6; a part 7 rendered integral with said pivot pin 6 and also called a link; a movable member constituted by another part 8, also called a rocker, which rotates with respect to part 7 and coaxially thereto, and by an electromagnet 9 mounted on said other part 8; and means 10 for displacing the other part 8.

Figure 2:
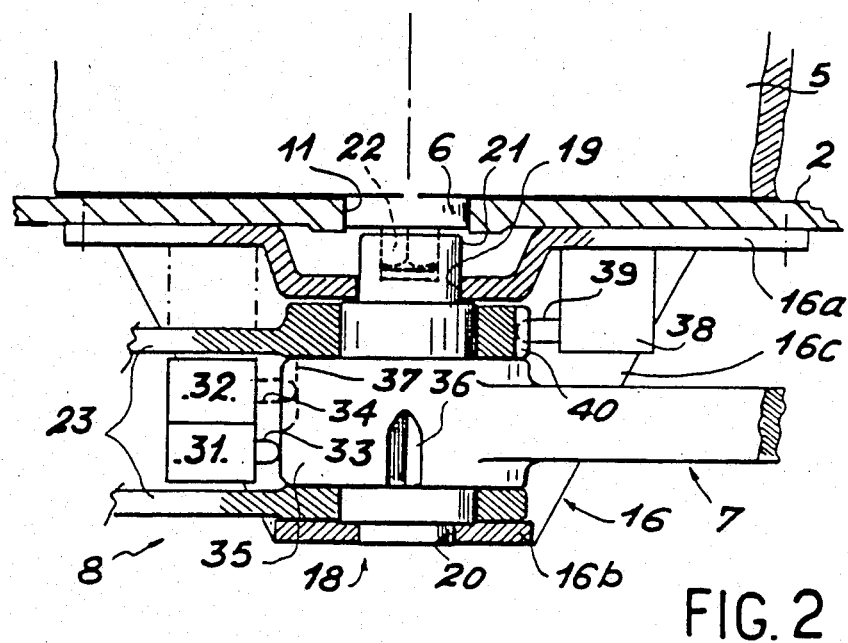
FIG. 2 a diagrammatic plan view of the blanking cover according to the invention and shown in FIG. 1, which shows how the latter is mounted on the pipe.

In the embodiment of FIG. 1, pivot pin 6 is horizontal and can rotate in bearings 11 provided on pipe 3 and whereof one is shown in FIG. 2. Plate 5, which is fixed to pivot pin 6, is able to occupy a first vertical position 12 in the considered embodiment and corresponding to the open state of pipe 2 and a second horizontal position 13 in the considered embodiment and corresponding to the closed state of pipe 2. Obviously, the shape of plate 5 is such that pipe 2 is effectively open (or closed) when plate 5 is vertical (or horizontal).

Moreover, plate 5 can pass from its first position 12 to its second position 13 by tilting in a clockwise direction about pivot pin 6, under the action of gravity. To this end, the position of pivot pin 6 relative to plate 5 is such that, when plate 5 is vertical, the horizontal plane containing pivot pin 6 is below the centre of gravity of plate 5. In other words, when said plate 5, assumed to be homogeneous, is in the horizontal position, distance $D_1$ between pin 6 and the left-hand end of plate 5 is less than the distance $D_2$ between pin 6 and the right-hand end of plate 5. In order to assist this tilting or rocking movement, pivot pin 6 is also located outside the plate and such that it is positioned above the latter when the plate is horizontal, in view of the tilting direction of plate 5, conditioned by the direction of air circulation within pipe 2. Moreover, two stops 14, 15 are fixed to pipe 2 with the latter, so as to define the second position 13 of plate 5, i.e. in order to stop the latter in the horizontal position when it is tilting.

Part or link 7, the other part or rocker 8 and displacement means 10 are mounted as will be explained hereafter on an e.g. U-shaped frame 16, formed by two flanges 16a, 16b (FIG. 2) connected by a base 16c and which are fixed to pipe 2, e.g. with the aid of screw 17, via one of the two flanges. Link 7 is provided with a spindle 18, which rotates in bearings 19, 20 provided respectively on the two flanges 16a, 16b. In addition, end 21 of spindle 18 of link 7 and end 22 of pivot pin 6 of plate 5 whereby said ends will face one another when frame 16 is fixed to pipe 5, are rigidly connected to one another, in such a way that pivot pin 6 of plate 5 and spindle 18 of link 7 form an extension of one another, when frame 16 is fixed to pipe 2. For this purpose end 22 of pivot pin 6 is e.g. hexagonal and end 21 of spindle 18 of link 7 then has a hexagonal hole serving to receive the hexagonal end 22.

Rocker 8 is mounted so as to rotate on spindle 18 of link 7 via an end 23, e.g. in the form of a cap of said rocker 8, the other end 24 (FIG. 1) thereof carrying electromagnet 9.

For example, the displacement means 10 comprises an electromagnetic jack having, in per se known manner, a body 25 and a rod 26. Body 25 can pivot relative to frame 16, about a horizontal spindle 27 and rod 26 is articulated to rocker 8.

Rocker 8 maintains the link 7 in a position 28 indicated by mixed lines in FIG. 1 and which corresponds to the open state of pipe 2, i.e. the vertical position 12 of plate 5, by means of the approximately excited electromagnet 9. For this purpose, link 7 is designed so as to form an acute angle $\alpha$, e.g. of 45° with plate 5, when it is rendered integral therewith by means of spindle 18 of link 7. This angle is counted by counterclockwise rotations from plate 5 towards link 7. Rocker 8 rotates on spindle 18 of link 7, so that it is behind the latter, always starting from plate 5 and rotating in a clockwise direction. Electromagnet 9 is mounted at the end 24 of rocket 8, so that its core 29 can touch an element 30 of link 7 made from soft iron and positioned at the end of link 7, when rocker 8 is placed against the latter. Jack 10, whose rod 26 can occupy a retracted position and a projecting position, is mounted on frame 16 in such a way that, when rod 26 and plate 5 are respectively in the retracted and vertical positions, core 29 of electromagnet 9 is in contact with element 30 of link 7 and that, when rod 26 and plate 5 are respectively in the extended and horizontal positions, core 29 of electromagnet 9 is also in contact with element 30 of link 7.

First and second electrical position switches 31 and 32 (FIG. 2) are mounted on frame 16 and serve to take account of the open or closed state of pipe 2. For example, switches 31 and 32 are microswitches respectively provided with first and second pushbuttons 33, 34 and juxtaposed on frame 16 in the vicinity of base 35 of link 7, said base having the spindle 18 of said link 7. Two slots 36, 37 are made on the periphery of base 35 and are respectively associated with pushbuttons 33, 34. The first microswitch 31 (respectively the second microswitch 32), is mounted on frame 16 in such a way that its pushbutton 33 (respectively 34) is in the extended state when the associated slot 36 (respectively 37) faces said pushbutton and is in the retracted state in the opposite case. Furthermore, slot 36, 37 are made on the periphery of base 35, in such a way that pushbuttons 33, 34 have opposite states, when link 7 is in its position corresponding to the open state of pipe 2 and also when link 7 is in its position corresponding to the closed state of pipe 2. For example, microswitches 31, 32 operate in the manner indicated in the following Table 1:

TABLE 1

|  | open pipe | closed pipe |
| --- | --- | --- |
| first pushbutton 33 | extended | retracted |
| second pushbutton 34 | retracted | extended |

A third electrical position switch 38 constituted e.g. by a microswitch and provided with a pushbutton 39 is mounted on frame 16 in the vicinity of base 35 and takes account of the position of rocker 8 and consequently the position of rod 26 (FIG. 1) of jack 10. A third slot 40 (FIG. 2) is made on the periphery of base 35 and is associated with the third microswitch 38. The latter is mounted on frame 16, in such a way that its pushbutton 39 is in the extended state when the third slot 40 faces the pushbutton, whilst it is in the retracted state in the opposite case. Moreverover, said third slot 40 is made on base 35 in such a way that pushbutton 39 of the third microswitch 38 is, for example, retracted when rod 26 (FIG. 1) of jack 10 is extended and is extended in the opposite case.

Per se known control means 41 are provided for receiving information from the microswitches 31, 32 and 38 (FIG. 2) regarding the retracted or extended state of the pushbuttons thereof and for controlling electromagnet 9 (FIG. 1) and jack 10, as a function of such information. The control means 41 are connected to display means 42 for the states of the microswitches, the jack and the electromagnet and consequently the open or closed state of the pipe 2. In addition, the control means 41 can be connected to one or more threshold temperature or slope detectors 43, located in pipe 2 in such a way that an operator, by controlling 41, can act on an electromagnet 9 and/or jack 10 as a function of signals received from these detectors 43. Moreover, the electrical connections between control means 41 and electromagnet 9, jack 10 and microswitches 31, 32 and 38 (FIG. 2) are provided by means of an electrical casing 44 mounted on frame 16 (FIG. 1) and from which emanate the various electrical connectors 45 permitting the control of electromagnet 9, jack 10 and microswitches 31, 32 and 38 (FIG. 2). The control means 41 (FIG. 1) can be very remote from the blanking cover according to the invention and casing 44 is, for example, provided with not shown electrical plug-in pins making it possible to establish between the same and the conrtrol means 41, the electrical connections necessary for the operation of the blanking cover according to the invention. This operation will now be described.

Normally pipe 2 is open. Plate 5 is maintained in the vertical position by the electromagnet 9, which is energized by control means 41 and whereof the core 29 then maintains link 7 in place via element 30 thereof, the jack rod 26 being in the retracted position in the present case. In the case of a fire indicated by detectors 43, the power supply to electromagnet 9 is interrupted, which releases link 7 and consequently plate 5, which then tilts under the action of gravity into its position corresponding to the closed state of pipe 2. Obviously link 7 is made so as to be sufficiently light compared with plate 5, for it not to oppose the tilting of the latter. The power supply of electromagnet 9 can also be interrupted during periodic operating tests of the blanking cover according to the invention.

If plate 5 does not tilt or rock after the interruption of the power supply of electromagnet 9 and which is made apparent by display means 42, jack 10 is activated so that its rod 26 passes from its retracted position to its extended position, thus pushing rocker 8, which in turn pushes link 7, which brings the plate 5 into the horizontal position and closes pipe 2. The electric power supply of electromagnet 9 is then interruped and rocker 8 can be brought into its initial position, corresponding to the retracted position of rod 26 of jack 10, the latter being activated for this purpose.

In the case of a false alarm or tests, the pipe 2 closed in the manner described hereinbefore can be reopened in the following way. Electromagnet 9 is supplied with power and jack 10 is activated, so as to move its rod 26 from the retracted state into the extended state, so that rocker 8 is rotated and its electromagnet 9 then comes into contact with element 30 of link 7. Element 30 is attracted by core 29 of electromagnet 9. The reverse control of jack 10 then again passes its rod 26 into the retracted position, which moves rocker 8 and consequently link 7 rearwards. Plate 5 is consequently in the vertical position and pipe 2 is again open. Obviously, the closing of pipe 2 could be made automatic, as soon as the temperature or the smoke concentration in the air contained therein exceeds a certain threshold.

In the blanking cover according to the invention, and as described hereinbefore, it is advantageously possible to use a jack with a regulatable end of travel. It is advantageously possible to make the ends of travel of plate 5 regulatable in rotation. Moreover, the materials constituting the various components of the blanking cover according to the invention (plate, link, rocker, etc.) in its application to arresting fires, can be determined by the Expert.

Thus, a blanking cover is obtained, which has a jack which cannot block the blanking cover in the open position and which is mechanically homogeneous, as a result of its construction. Moreover, the frame can be fitted from one or other side of the plate, obviously by adapting the corresponding end of the pivot pin, whereas in the prior art it was necessary to have access to the two opposite sides of the blanking covers, the opening and closing mechanism thereof being located on two different sides of the same, which imposed a complicated geometry on the pipes. Moreover, all the elements of the blanking cover mechanism according to the invention are located on this frame and can therefore be fitted or dismantled all at ones, so that during fitting or dismantling, it is not necessary to render inoperative the remainder of the installation of which the blanking cover forms a part.

Figure 3:
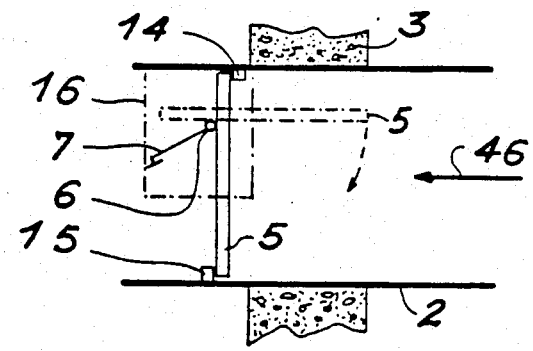
FIGS. 3 and 4 diagrammatic views of pipe blanking covers according to the invention, respectively mounted on a horizontal pipe and on a vertical pipe.

FIG. 3 diagrammatically shows a blanking cover according to the invention, mounted on a horizontal pipe 2. This blanking cover comprises the same elements as those shown in FIGS. 1 and 2, but they are obviously fitted taking account of the orientation of pipe 2. Air is able to circulate in pipe 2 in the direction indicated by arrow 46. Thus, plate 5 of the blanking cover tilts in the same direction, from a horizontal position corresponding to the open pipe to a vertical position corresponding to the closed pipe.

Figure 4:
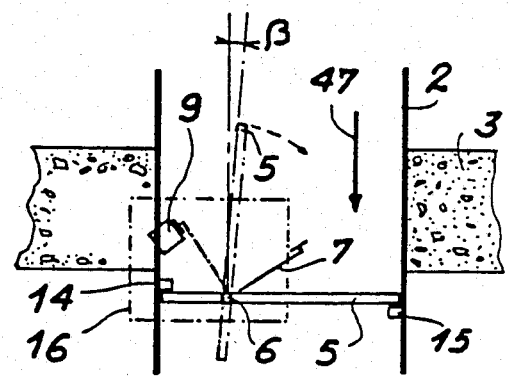

FIG. 4 diagrammatically shows a blanking cover according to the invention, mounted on a vertical pipe 2. This blanking cover is identical to that shown in FIGS. 1 and 2, with the exception of the position of plate 5 corresponding to the open state of pipe 2. Link 7 is rendered integral with the pivot pin 6, in such a way that in said position, plate 5 is inclined by an angle $\beta$ with respect to the vertical, said angle being calculated in the tilting direction of plate 5 with respect to the vertical. This makes it unnecessary for pivot pin 6 to be outside plate 5. FIG. 4 shows that air can also circulate in pipe 2 in a direction indicated by an arrow 47 and plate 5 then tilts in the same direction.

Obviously in the preceding description, a very broad meaning is given to the word "pipe". The invention is applicable to the closing or sealing of any opening made in a wall. The thickness of said wall is never zero, so that the opening can be considered as a pipe of limited length.

What is claimed is:
1. A blanking cover for a pipe comprising:
closing means mounted in said pipe, said closing means being movable between open and closed positions corresponding respectively to open and closed states of the pipe, said closing means being adapted to move from said open position to said closed position under the action of gravity,
a part exterior of the pipe and attached to a frame, said part being integrally connected to said closing means and being movable between first and second positions corresponding to said closing means open and closed positions wherein movement of said closing means can be effectuated by correspondng movement of said part,
a member exterior of the pipe and attached to said frame and arranged to be relatively movable with respect to said part, said movable member having a locking means capable of being 9 activated to engage said part, said locking means fixedly maintaining said part in relative engagement with the movable member upon activation of the locking means,
means for displacing said movable member, and control means for selectively activating and deactivating said locking means wherein said movable member under control of said displacing means moves said part from said second position to said first position when said locking means is activated and engaged with said part, said part being maintainable in said first position by said member so long as said lacking means is activated and thereby said closing means is maintainable in said open position, said closing means closed position being obtained when said locking means is deactivated thereby disengagable said movable member and part from each other, said closing means thereafter moving to said closed position under force of gravity, said movable member being displaceable under control of said displacement means to cause non-gravitational movement of said closing means to said closed position by mechanical engagement of said movable member and said part thereby ensuring closure of the pipe when said closing means fails to move towards said closed position after deactivation of said means, the displacement means for displacing the movable member being a jack having a body, and a rod articulated on the member, and wherein the jack is able to displace the member by means of said rod.

2. A blanking cover for a pipe comprising:

closing means mounted in said pipe, said closing means being movable between open and closed positions corresponding respectively to open and closed states of the pipe, said closing means being adapted to move from said open position to said closed position under the action of gravity, a part exterior of the pipe and attached to a frame, said part being integrally connected to said closing means and being movable between first and second positions corresponding to said closing means open and closed positions wherein movement of said closing means can be effectuated by corresponding movement of said part, a member exterior of the pipe and attached to said frame and arranged to be relatively movable with respect to said part, said movable member having a locking means capable of being activated to engage said part, said locking means fixedly maintaining said part in relative engagement with the movable member upon activation of the locking means, means for displacing said movable member, and control means for selectively activating and deactivating said locking means wherein said movable member under control of said displacing means moves said part from said second position to said first position when said locking means is activated and engaged with said part, said part being maintainable in said first position by said member so long as said locking means 9 is activated and thereby said closing means is maintainable in said open position, said closing means closed position being obtained when said locking means is deactivated thereby disengaging said movable member and part from each other, said closing means thereafter moving to said closed position under force of gravity, said movable member being displaceable under control of said displacement means to cause non-gravitational movement of said closing means to said closed position by mechanical engagement of said movable member and said part thereby ensuring closure of the pipe when said closing means fails to move towards said closed position after deactivation of said locking means, the closing means having a plate able to pivot within the pipe by means of a pivot pin with which the plate is rendered integral, wherein the part is fixed to the pivot pin and wherein the member rotates with respect to said part and coaxially thereto.

3. A pipe blanking cover according to claim 3, wherein stops are provided within the pipe to define the closed position of the closing means plate.

4. A pipe blanking cover according to claim 3, wherein a fluid is able to flow in the pipe and the plate tilts in the fluid flow direction.

5. A pipe blanking cover according to claim 2, wherein, with the pipe vertical, the pivot pin is positioned outside the plane of the plate, so as to aid the gravitational tilting of the plate.

6. A pipe blanking cover according to claim 2, wherein said engaging means including an electromagnet which can be activated and deactivated by the control means and is mounted on said member, the displacement means being a jack having a rod which is articulated to said member, whilst the part has an element which can be attracted by the electromagnet, when the electromagnet is activated.

7. A pipe blanking cover according to claim 2, wherein said closing member, said part and said displacement means are mounted on a frame that can be fixed to the pipe, and said part having a rotation spindle for rotating relative to the frame and being rigidly connected to the pivot pin of said plate and in the extension thereof once the frame has been fixed to the pipe.

8. A blanking cover for a pipe comprising:

closing means mounted in said pipe, said closing means being movable between open and closed positions corresponding respectively to open and closed states of the pipe, said closing means being adapted to move from said open position to said closed position under the action of gravity, a part exterior of the pipe and attached to a frame, said part being integrally connected to said closing means and being movable between first and second positions corresponding to said closing means open and closed positions wherein movement of said closing means can be effectuated by corresponding movement of said part, a member 8 exterior of the pipe and attached to said frame and arranged to be relatively movable with respect to said part, said movable member having a locking means capable of being activated to engage said part, said locking means fixedly maintaining said part in relative engagement with the movable member upon activation of the locking means, means for displacing said movable member, and control means for selectively activating and deactivating said locking means wherein said movable member under control of said displacing means moves said part from said second position to said first position when said locking means is activated and engaged with said part, said part being maintainable in said first position by said member so long as said locking means is activated and thereby said closing means is maintainable in said open position, said closing means closed position being obtained when said locking means is deactivated thereby disengaging said movable member and part from each other, said closing means thereafter moving to said closed position under force of gravity, said movable member being displaceable under control of said displacement means to cause non-gravitational movement of said closing means to said closed position by mechanical engagement of said movable member and said part thereby ensuring closure of the pipe when said closing means fails to move towards said closed position after deactivation of said locking means, said cover including two electrical position switches said switches cooperating with said part, to indicate the open or closed state of the pipe.

9. A piper blanking cover according to claim 8, wherein said cover includes a third electrical position switch cooperating with said member to indicate the position of said member.

10. A blanking cover for a pipe comprising:

closing means mounted in said pipe, said closing means being movable between open and closed positions corresponding respectively to open and closed states of the pipe, said closing means being adapted to move from said open position to said closed position under the action of gravity, a part exterior of the pipe and attached to a frame, said part being integrally connected to said closing means and being movable between first and second positions corresponding to said closing means open and closed positions wherein movement of said closing means can be effectuated by corresponding movement of said part, a member exterior of the pipe and attached to said frame and arranged to be relatively movable with respect to said part 7, said movable member having a locking means capable of being activated to to engage said part, said locking means fixedly maintaining said part in relative engagement with the movable member upon activation of the locking means, means for displacing said movable member, and control means for selectively activating and deactivating said locking means wherein said movable member under control of said displacing means moves said part from said second position to said first position when said locking means is activated and engaged with said part, said part being maintainable in said first position by said member so long as said locking means is activated and thereby said closing means is maintainable in said open position, said closing means closed position being obtained when said locking means is deactivated thereby disengaging said movable member and said part from each other, said closing means thereafter moving to said closed position under force of gravity, said movable member being displaceable under control of said displacement means to cause non-gravitational movement of said closing means to said closed position by mechanical engagement of said movable member and said part thereby ensuring closure of the pipe when said closing means fails to move towards said closed position after deactivation of said locking means.

11. A blanking cover for a pipe comprising:

closing means mounted in said pipe, said closing means being movable between open and closed positions corresponding respctively to open and closed states of the pipe, said closing means being adapted to move from said open position to said closed position under force of gravity, said closing means including a plate adapted to pivot within the pipe by means of a pivot pin integral with said plate, wherein said closing means pivots to said closed position under the force of gravity, a part exterior of the pipe and attached to a frame, said part being fixed to said pivot pin and being movable between first and second positions corresponding to said closing means open and closed positions wherein movement of said closing means can be effectuated by corresponding movement of said part, a member exterior of the pipe and attached to said frame and being rotationally movable coaxially with respect to said part, said member 8 having a locking means activated to engage a portion of said part, said locking means fixedly maintaining said part in relative engagement with the movable member upon activation of the locking means, said locking means including an electromagnet mounted on said member and rotating with said member and with respect to said part, said portion of said part being attractable to said electromagnet when said electromagnet is activated, means for rotationally displacing said member, said displacement means including a jack articulated to said member, and control means for selectively activating and deactivating said electromagnet wherein said member under control of said displacement means moves said part from said second position to said first position when said electromagnet is activated and engaged with said portion, said part being maintainable in said first position by said member so long as said electromagnet is activated and thereby said closing means is maintainable in said open position, said closing means closed position being obtained when said electromagnet is deactivated thereby disengaging said movable member and part from each other, said closing means thereafter pivoting to said closed position under force of gravity, said movable member being rotationally displaceable under control of said displacement means to cause non-gravitational movement of said closing means to said closed position by mechanical engagement of said member with said part thereby ensuring closure of the pipe when said closing means fails to move towards said closed position after deactivation of said electromagnet.

* * * * *

UNITED STATES PATENT AND TRADEMARK OFFICE
CERTIFICATE OF CORRECTION

PATENT NO. : 4,650,154

DATED : March 17, 1987

INVENTOR(S) : Jacques Pobelle

It is certified that error appears in the above-identified patent and that said Letters Patent is hereby corrected as shown below:

Column 6, line 64, claim 1, delete "9".

Column 7, line 8, claim 1, changed "lacking" to --locking--;
line 57, claim 2, delete "9".

Column 8, line 49, claim 8, delete "8".

Column 9, line 35, claim 10, delete "7".

Column 10, line 25, claim 11, delete "8".

Signed and Sealed this

Seventeenth Day of November, 1987

*Attest:*

DONALD J. QUIGG

*Attesting Officer*  *Commissioner of Patents and Trademarks*